United States Patent [19]
Scharton et al.

[11] 3,826,331
[45] July 30, 1974

[54] METHOD OF AND APPARATUS FOR REDUCING SOUND GENERATED BY SURFACES IN FLUID JET STREAMS AND THE LIKE

[75] Inventors: Terry D. Scharton; Benjamin Pinkel, both of Santa Monica, Calif.

[73] Assignee: Bolt, Beranek and Newman, Inc., Cambridge, Mass.

[22] Filed: Aug. 20, 1973

[21] Appl. No.: 389,786

Related U.S. Application Data

[63] Continuation of Ser. No. 230,380, Feb. 29, 1972, abandoned.

[52] U.S. Cl. ............................ 181/33 HC, 244/1 N
[51] Int. Cl. ............................................. B64d 33/06
[58] Field of Search ...... 181/33 HB, 43, 33 HC, 53; 239/265.13, 265.17; 244/1 N, 42 CB, 42 CC, 42 CD, 42 DA

[56] References Cited
UNITED STATES PATENTS

| | | | |
|---|---|---|---|
| 2,874,536 | 2/1959 | Benson et al. | 181/33 HC |
| 2,886,121 | 5/1959 | Welbourn | 181/33 HC |
| 2,955,917 | 11/1960 | McGehee | 239/265.17 |
| 3,227,240 | 1/1966 | Lee et al. | 239/165.17 X |
| 3,463,402 | 8/1969 | Langston | 181/33 HC |
| 3,592,291 | 7/1971 | Medawar | 239/265.17 X |
| 3,724,784 | 4/1973 | Von Ohain et al. | 244/42 CC |

*Primary Examiner*—Richard B. Wilkinson
*Assistant Examiner*—John F. Gonzales
*Attorney, Agent, or Firm*—Rines and Rines; Shapiro and Shapiro

[57] ABSTRACT

Noise is reduced by the use of preferably slot apertures near the trailing edge, for example, of a sheet, over one surface of which a fluid jet or other stream is passing, for directing fluid from an auxiliary source which is ducted to the opposite face of the sheet, through the sheet to produce buffer layers between said one surface and said fluid jet at and downstream of the said apertures, thereby suppressing noise generation at the discontinuity provided by the said trailing edge of the sheet.

8 Claims, 1 Drawing Figure

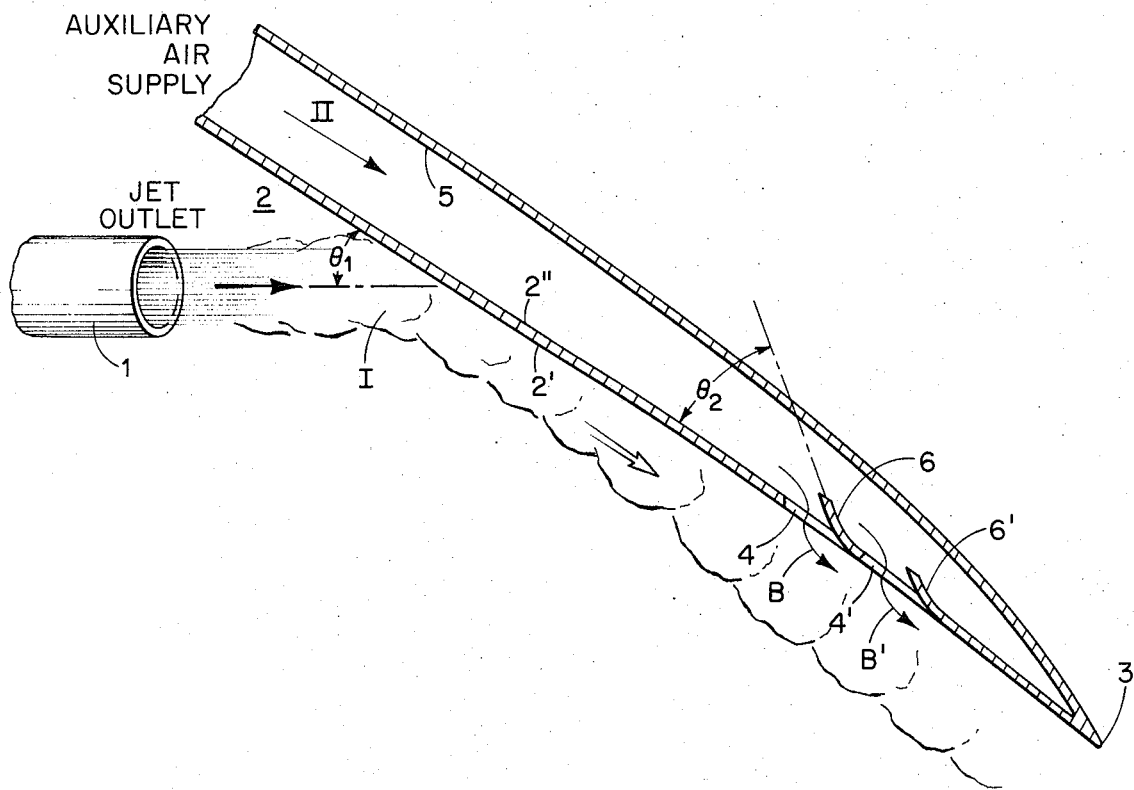

METHOD OF AND APPARATUS FOR REDUCING SOUND GENERATED BY SURFACES IN FLUID JET STREAMS AND THE LIKE

This is a continuation application of Ser. No. 230,380, filed Feb. 29, 1972, now abandoned.

The present invention relates to methods of and apparatus for reducing noise or sound generated by surfaces in fluid jet streams and the like, more particularly by the surface discontinuity provided by the trailing edge of such surfaces.

There have been numerous approaches to the broad problem of reducing sound generated by fluid flow streams, such as those produced at jet or nozzle outlets and the like, including vortex-destroying vanes, tubes, flaps and other surfaces. Such nozzle noise reduction devices are described, for example, in AIAA Paper No. 68-1023, "Perspective of SST Aircraft Noise Problem," October, 1968, G. S. Schauer et al.

While such devices do successfully operate, it sometimes happens that such interposed surfaces, and, of course, other vanes, flaps, plates, airfoils or the like, including augmentor wings and blown flap lift systems (all hereinafter generally referred to as "sheets"), interposed in fluid flow streams, themselves serve to generate noise at the discontinuity provided by, for example, their free trailing edges or the like. Theory indicates that the noise generated by a surface of a sheet in a turbulent fluid stream originates from the trailing edge of the surface. At other regions of the sheet, the fluctuating pressures associated with the moving vortices in the fluid flow impose alternate positive and negative forces on the sheet which, for subsonic flow, balance each other out, leaving a zero overall oscillating force. Because of the surface discontinuity at the trailing edge, however, this pressure balance no longer occurs and noise is consequently generated by the unbalanced alternating pressure.

An object of the present invention, accordingly, is to provide a new and improved method of and apparatus for reducing the sound generated by such surfaces in fluid jet and similar streams.

A further object is to provide a novel noise suppressor of more general applicability, also.

Other and further objects will be explained hereinafter and are more particularly pointed out in the appended claims. In summary, however, from one of its aspects, the invention contemplates the use of preferably slot apertures near the trailing edge, for example, of a sheet, over one surface of which a fluid jet or other stream is passing, and directing an auxiliary fluid flow along the opposite surface and through said apertures to produce buffer layers between said one surface and the fluid stream at the apertures, thereby suppressing noise generation at the discontinuity provided by the said trailing edge of the sheet.

The invention will now be described with reference to the accompanying drawing the single figure of which is a schematic representation of a preferred embodiment, with conventional structural details omitted so as not to detract from the basic substance of the invention and the discovery underlying the same.

Referring to the drawing, a conventional jet outlet (or other fluid stream source) is shown at 1, emitting a turbulent oscillatory-pressure primary jet stream I which is illustrated as striking a sheet 2 at its undersurface 2' along a generally acute angle $\theta_1$, and then flowing along the surface 2' with the inducted air to the trailing free edge 3 thereof at which the beforementioned noise is normally generated. The sheet 2 may be part of a noise reduction system as described in the before-mentioned publication and other aircraft application or any other surface in such a fluid stream.

In accordance with the invention, preferably a plurality of slot apertures 4, 4', etc. is provided intermediate of the sheet 2 but near the trailing edge 3 and extending substantially parallel thereto (transversely into the sheet of drawing). It has been discovered that if an auxiliary fluid stream II is carried by a duct to the opposite surface 2" of the sheet 2, which duct for the purpose of illustration is represented by sheets 2 and 5, and is directed through slot apertures 4 and 4" preferably at an acute angle $\theta_2$ to the surface 2 (as shown by the arrows) by means of the guide vanes 6 and 6', novel noise suppression is attained. The fluid from the auxiliary source exits through narrow transverse slot paths provided by the apertures 4, 4', etc. to the under surface 2', and there interposes buffer layers at the regions B, B', etc. thereof between the sheet 2 and the primary jet stream I. These buffer layers B, B', etc. of fluid have been found to decrease the impact upon the trailing edge 3 of the oscillatory pressures present in the primary jet stream I. The sound-suppressing effectiveness of the buffer fluid layers, moreover, has been determined to be sensitive to the distance of the slots 4, 4', etc. from the trailing edge 3. In general it will suffice for and it is preferably arranged that the speed of the auxiliary fluid flow be less than the speed of the primary jet streams.

Successful tests have been made with air issuing from a main jet 1 at velocities of 500 and 900 ft/sec. and with angles $\theta_1$ of 30° and 60° relative to the plane of the sheet 2, with a pair of transverse slots 4, 4' about 2 inches in width, spaced about ⅛ inch and ⅛ inch inward of and disposed parallel to the trailing edge 3 of a sheet about 2¼ inches in transverse dimension and about 6 inches in length. From 4 to 6 db of overall noise reduction was measured relative to the noise generated with no auxiliary air flow II; though when the auxiliary air supply pressure was increased to about 12 inches of $H_2O$, with $\theta_1$ about 30°, the 6db noise reduction was attained.

Further modifications will occur to those skilled in this art and all such are considered to fall within the spirit and scope of the invention as defined in the appended claims.

What is claimed is:

1. A method of preventing the generation of noise at the surface discontinuity provided by a free edge, such as the trailing edge, of a sheet in an ambient fluid medium as a fluid stream leaves the confines of a fluid stream outlet, mixes with the ambient medium in a space between said outlet and said sheet, impinges upon one surface of said sheet, and flows over said surface as an oscillatory-pressure turbulent stream, the method comprising, providing in combination with said oscillatory-pressure stream, an auxiliary fluid flow at the opposite surface of said sheet while said oscillatory-pressure fluid stream is flowing over said one surface, and communicating said auxiliary fluid flow from said opposite surface through said sheet to said one surface near said free edge to interpose fluid buffer layers between said one surface and said oscillatory-pressure fluid stream at regions near said free edge so as to decrease the impact on said free edge of the oscillatory pressures of said oscillatory-pressure fluid stream and thereby suppress noise generation thereat.

2. A method as claimed in claim 1 and in which said auxiliary flow is discharged through said sheet nearly parallel to said one surface of the sheet.

3. A method as claimed in claim 2 and in which said communicating is effected through a plurality of narrow paths near said free edge and running substantially parallel thereto.

4. A method as claimed in claim 1 and in which the speed of the auxiliary fluid flow is adjusted to be less than the speed of the oscillatory-pressure fluid stream.

5. Apparatus for preventing the generation of noise at the surface discontinuity provided by a free edge, such as the trailing edge, of a sheet member in an ambient fluid medium as a fluid stream leaves the confines of a fluid stream outlet, mixes with the ambient medium in a space between said outlet and said sheet member, impinges upon one surface of said sheet member, and flows over said surface as an oscillatory-pressure turbulent stream, said apparatus comprising, in combination with said outlet and said sheet member, means for producing auxiliary fluid flow at the opposite surface of said sheet member while said oscillatory-pressure fluid stream is flowing over said one surface, and aperture means disposed in said sheet member near said free edge for communicating at least part of said auxiliary fluid flow from said opposite surface through said sheet member to said one surface and generate fluid buffer layers between said one surface and said oscillatory-pressure fluid stream that decrease the impact on said free edge of the oscillatory pressures of said oscillatory-pressure fluid stream and thereby suppress noise generation thereat.

6. Apparatus as claimed in claim 5 and in which means is provided for directing the auxiliary flow through said aperture means nearly parallel to the said sheet member.

7. Apparatus as claimed in claim 6 and in which said aperture means comprises a plurality of narrow slots disposed substantially parallel to said free edge and at successive regions inward of but close to said free edge, the leading edges of the said slots being contoured to guide the auxiliary flow at an acute angle to said sheet member.

8. Apparatus as claimed in claim 5 and in which the auxiliary fluid flow producing means is adjusted to produce flow speed less than the speed of the oscillatory-pressure fluid stream.

* * * * *